V. D. STODDARD.
Check-Row Seed-Planter.

No. 45,192.  Patented Nov. 22, 1864.

UNITED STATES PATENT OFFICE.

VOLCOTT D. STODDARD, OF MUSCATINE, IOWA.

IMPROVED CORN-PLANTER.

Specification forming part of Letters Patent No. 45,192, dated November 22, 1864.

*To all whom it may concern:*

Be it known that I, VOLCOTT D. STODDARD, of Muscatine, in the county of Muscatine and State of Iowa, have invented a new and Improved Corn Marker and Planter; and I do hereby declare that the following is a full, clear, and exact description of the same, reference being had to the accompanying drawings, forming a part of this specification, in which—

Figure 1:
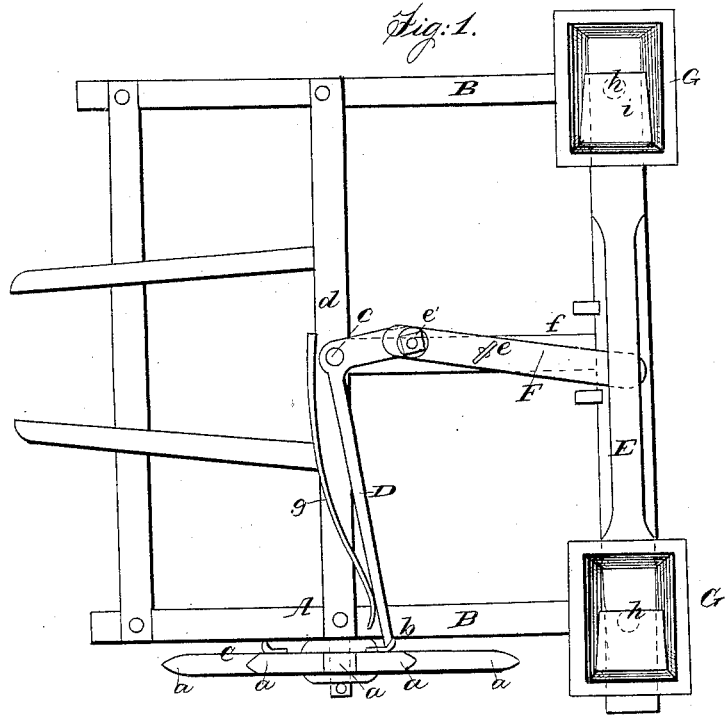
Figure 2:
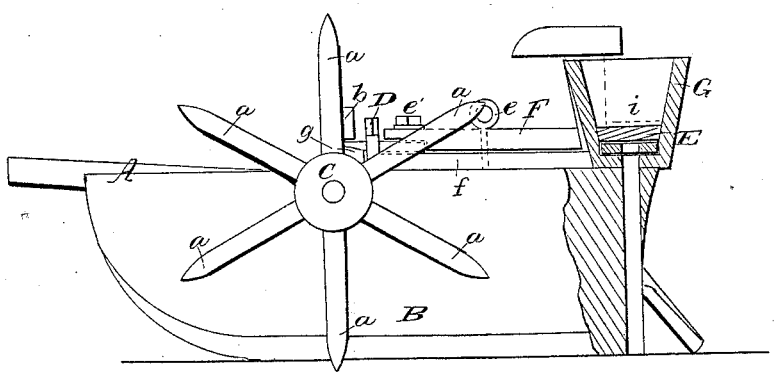

Figure 1 represents a top view of my invention. Fig. 2 is a sectional side elevation of the same.

Similar letters of reference in both views indicate corresponding parts.

This invention relates to an improvement in that class of corn-planters which require no marking, and in which two hills are planted simultaneously by the automatic action of the machine, the machine being so arranged that the seed is dropped at regular intervals and that the growing plants can be plowed both ways.

The nature of my invention and its advantages will be readily understood from the following description:

A represents a frame made of wood or any other suitable material or materials, and provided with two runners, B, which support it, and on which said frame can be readily drawn through a field or from one field to another.

C is a wheel composed of a series of sharp-pointed arms, $a$, of such a length that the circumference of a circle drawn through said points bears an even ratio to the distance at which the hills are to be planted. In the drawings this wheel is so proportioned that its circumference is equal to twice the distance of the hills, and it is provided with two tappets, $c$, which come in contact with the end of the elbow-lever D, through which motion is imparted to the seed-slide E.

The lever D is secured by means of a pivot, $o$, to the central cross-bar, $d$, of the frame A, and its short arm connects by a pivot, $e$, with a lever, F, that has its fulcrum on a pivot, $e$, in the longitudinal central bar, $f$, of the frame. This lever enters into a cavity in the edge of the seed-slide, and a spring, $g$, which bears on the long arm of the elbow-lever D, throws the whole system of levers in such a position that the seed-cells $h$ are protected by the abutments $i$ in the hopper G, and no seed is allowed to discharge.

If this machine is drawn through a field, the runners B cut into the ground and make the furrows to receive the seed, and at the same time the pointed arms of the wheel C will enter the ground far enough to turn each wheel and to actuate the seed-slide. By these means the ground is spaced off as accurately as it can be by a pair of dividers, and by starting at a given point the field is check-rowed as accurately as it can be done by having the ground previously furrowed one way and an extra hand at the machine to drop the seed. If the machine runs on wheels instead of runners, it will gain or lose, according to the ground over which it runs, and the rows will not be regular; but by my machine the distance of the rows depends entirely upon the action of the pointed arms, and the machine, being drawn on runners, can neither gain nor lose. In turning or driving over the field I remove the pin $c$, which forms the fulcrum of the lever F, and the motion of the seed-slide stops.

It is obvious that the motion of the seed-slide can be increased or decreased at pleasure by changing the proportion of the arms of the elbow-lever D and of the lever F, and at the same time by means of these levers the operation of the seed-slide is facilitated and performed with the least possible strain on the working parts.

What I claim as new, and desire to secure by Letters Patent, is—

The armed wheel C, in combination with the runners B, elbow-lever D, lever F, movable pin $e$, and seed-slide F, all constructed and operating in the manner and for the purpose herein shown and described.

V. D. STODDARD.

Witnesses:
THOMAS HANNA,
I. B. FITZGERALD.